(12) United States Patent
Gao et al.

(10) Patent No.: US 8,898,389 B2
(45) Date of Patent: *Nov. 25, 2014

(54) MANAGING HIGH SPEED MEMORY

(71) Applicant: International Business Machines Corporation, Armonk, NY (US)

(72) Inventors: Xue D. Gao, Shanghai (CN); Chao G. Li, Shanghai (CN); Yang Liu, Shanghai (CN); Yi Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,709

(22) Filed: Mar. 8, 2013

(65) Prior Publication Data

US 2013/0262794 A1 Oct. 3, 2013

Related U.S. Application Data

(63) Continuation of application No. 13/431,479, filed on Mar. 27, 2012.

(30) Foreign Application Priority Data

Mar. 31, 2011 (CN) .......................... 2011 1 0079728

(51) Int. Cl.
*G06F 12/00* (2006.01)
*G06F 13/00* (2006.01)
*G06F 13/28* (2006.01)
*G06F 12/12* (2006.01)
*G06F 12/08* (2006.01)

(52) U.S. Cl.
CPC .......... *G06F 12/00* (2013.01); *G06F 2212/217* (2013.01); *G06F 12/0866* (2013.01); *G06F 12/121* (2013.01)
USPC ............................ 711/117; 711/134; 711/159

(58) Field of Classification Search
USPC .......................................... 711/117, 134, 159
See application file for complete search history.

(56) References Cited

U.S. PATENT DOCUMENTS 6,141,731 A * 10/2000 Beardsley et al. ............. 711/136
6,738,865 B1 * 5/2004 Burton et al. ................. 711/133
(Continued)

FOREIGN PATENT DOCUMENTS

CN 101714062 A 5/2010

OTHER PUBLICATIONS

International Search Report and Written Opinion, International Application No. PCT/CN2012/070971 dated May 17, 2012, 9 pages.
U.S. Appl. No. 13/431,479, Image File Wrapper printed from PAIR, Mar. 7, 2013, 1 page.
"SSD Caching versus Tiering", http://tekinerd.com/2010/11/ssd-caching-versus-tiering/, TekiNerd, Server and Storage Technology Blog, Nov. 8, 2010, 4 pages.

(Continued)

*Primary Examiner* — Michael Alsip
(74) *Attorney, Agent, or Firm* — Stephen R. Tkacs; Stephen J. Walder, Jr.; Randall J. Bluestone

(57) ABSTRACT

A mechanism is provided for managing a high speed memory. An index entry indicates a storage unit in the high speed memory. A corresponding non-free index is set for a different type of low speed memory. The indicated storage unit in the high speed memory is assigned to a corresponding low speed memory by including the index entry in the non-free index. The storage unit in the high speed memory is recovered by demoting the index entry from the non-free index. The mechanism acquires a margin performance loss corresponding to a respective non-free index in response to receipt of a demotion request. The mechanism compares the margin performance losses of the respective non-free indexes and selecting a non-free index whose margin performance loss satisfies a demotion condition as a demotion index and selects an index entry from the demotion index to perform the demotion operation.

9 Claims, 2 Drawing Sheets

(56) References Cited

U.S. PATENT DOCUMENTS

| | | |
|---|---|---|
| 6,851,024 B1 | 2/2005 | Wilkes et al. |
| 6,978,349 B1* | 12/2005 | Wilkes .................. 711/118 |
| 6,993,629 B2 | 1/2006 | Beardsley et al. |
| 6,996,676 B2 | 2/2006 | Megiddo et al. |
| 7,721,061 B1* | 5/2010 | Kelly et al. ................ 711/167 |
| 8,095,738 B2* | 1/2012 | Benhase et al. ............. 711/134 |
| 8,510,528 B2* | 8/2013 | Rubio et al. ................ 711/165 |
| 2005/0268037 A1* | 12/2005 | Hama et al. ................ 711/118 |
| 2006/0236033 A1 | 10/2006 | Guinn et al. |
| 2010/0088459 A1 | 4/2010 | Arya et al. |
| 2010/0211731 A1 | 8/2010 | Mittendorff et al. |
| 2010/0235569 A1 | 9/2010 | Nishimoto et al. |
| 2010/0318744 A1 | 12/2010 | Benhase et al. |
| 2010/0325356 A1 | 12/2010 | Ash et al. |
| 2012/0254564 A1 | 10/2012 | Gao et al. |

OTHER PUBLICATIONS

Brewer, Eric A., "CS262A Midterm Solutions", http://www.cs.berkeley.edu/~brewer/cs262/Midterm-answers.pdf, Fall 2010, Berkeley, California, 7 pages.

Gill, Binny S. et al., "AMP: Adaptive Multi-stream Prefetching in a Shared Cache", 5th USENIX Conference on File and Storage Technologies (FAST'07), San Jose, California, Feb. 13-16, 2007, pp. 185-198.

Gill, Binny S. et al., "SARC: Sequential Prefetching in Adaptive Replacement Cache", Proceedings of the Annual Conference on USENIX Annual Technical Conference, USENIX'05, Anaheim California, Apr. 10-15, 2005, pp. 293-308.

Gill, Binny S. et al., "WOW: Wise Ordering for Writes—Combining Spatial and Temporal Locality in Non-Volatile Caches", 4th USENIX Conference on File and Storage Technologies (FAST'05), San Francisco, California, Dec. 13-16, 2005, pp. 129-142.

\* cited by examiner

MANAGING HIGH SPEED MEMORY

BACKGROUND

The present invention relates to data storage technology, and more specifically, to a mechanism for managing a high speed memory.

A general storage system consists of a processor, a high speed memory and a low speed memory. Since a response time of the processor's access to the high speed memory is far less than that of the access to the low speed memory, the access speed can be greatly improved by storing in the high speed memory a copy of the data that are accessed frequently in the low speed memory. On the other hand, the data capacity of a high speed memory is far less than that of the low speed memory, so a certain control mechanism is needed to guarantee that the high speed memory stores only the data that are most probably to be frequently accessed. For example, according to a control mechanism called Least Recently Used (LRU) algorithm, for those data that are not used recently in the high speed memory, they will be demoted from the high speed memory in order to make room for loading other data. Those skilled in the art would appreciate that, the high speed memory and the low speed memory here are relative concepts, for example, for an internal memory and a hard disk, the internal memory is a high speed memory whereas the hard disk is a low speed memory; whereas, for the cache and the internal memory, the cache is a high speed memory and the internal memory is a low speed memory.

When there exist different types of low speed memories in the storage system, if a difference between the low speed memories is not taken into consideration while implementing the LRU algorithm, this possibly will bring deterioration of the overall performance. Assume that there are a first type of low speed memory and a second type of low speed memory with different response time in the storage system. The first type of low speed memory is for example a hard disk drive (HDD), and the second type of low speed memory is for example a solid state disk (SSD). In general, SSD has a higher IO rate or IO density than HDD. As a result, statistically, the number of times that a piece of data from SSD in the high speed memory is accessed in an elementary time interval is greater than the number of times that a piece of data from HDD in the high speed memory is accessed in an elementary time interval. According to the LRU algorithm, the high speed memory will store more data from SSD. However, the response time of SSD is less than the response time of HDD, so storing the data from HDD in the high speed memory can bring more improvements on performance. For example, if a piece of data is not stored in the high speed memory, reading the data directly from a HDD with 15000 RPM needs an average response time of 10 ms, but reading the data directly from a SSD needs an average response time of less than 1 ms.

Therefore, there exists a need for a solution of managing the high speed memory in a hybrid low speed memory system, to thereby optimize the overall performance of the system.

SUMMARY

The embodiments of the invention provide a method and apparatus for managing a high speed memory.

According to an embodiment of the invention, a method of managing a high speed memory is provided, wherein an index entry indicates a storage unit in the high speed memory, a corresponding non-free index is set for a different type of low speed memory, the indicated storage unit in the high speed memory is assigned to a corresponding low speed memory by including the index entry in the non-free index, and the storage unit in the high speed memory is recovered by demoting the index entry from the non-free index, the method comprising: acquiring a margin performance loss corresponding to a respective non-free index in response to receipt of a demotion request, wherein the margin performance loss represents a change in a processor read operation time caused by performing a demotion operation in a corresponding non-free index; comparing the margin performance losses of the respective non-free indexes and selecting a non-free index whose margin performance loss satisfies a demotion condition as a demotion index; and selecting an index entry from the demotion index to perform the demotion operation.

According to an embodiment of the invention, an apparatus for managing a high speed memory is provided, wherein an index entry indicates a storage unit in the high speed memory, a corresponding non-free index is set for a different type of low speed memory, the indicated storage unit in the high speed memory is assigned to a corresponding low speed memory by including the index entry in the non-free index, and the storage unit in the high speed memory is recovered by demoting the index entry from the non-free index, the apparatus comprising: a margin performance loss acquiring module configured to acquire a margin performance loss corresponding to a respective non-free index in response to receipt of a demotion request, wherein the margin performance loss represents a change in a processor read operation time caused by performing a demotion operation in a corresponding non-free index; a demotion index selecting module configured to compare the margin performance losses of the respective non-free indexes and select a non-free index whose margin performance loss satisfies a demotion condition as a demotion index; and a demotion operation performing module configured to select an index entry from the demotion index to perform the demotion operation.

The technical solutions provided according to the embodiments of the invention manage the high speed memory by virtue of the improved performance, thereby improving the overall performance of a system in the system with a hybrid low speed memory.

DETAILED DESCRIPTION

Figure 1:
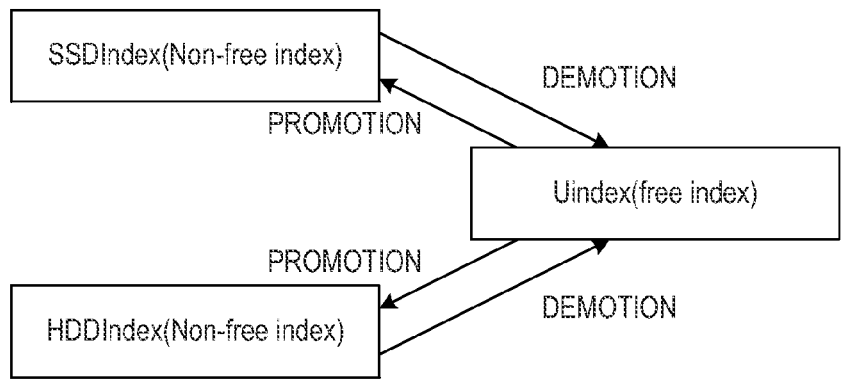
FIG. 1 is a schematic diagram showing indexes of the high speed memory in the hybrid low speed memory system.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms. It should be further noted that, in order to avoid the invention from being blurred by unnecessary details, only apparatus structure and/or processing steps closely associated with the solutions of the invention are shown in the accompanying drawings, but other details having few relations with the invention are omitted. Furthermore, unless "direct" or "indirect" is used designedly for definition, the connection in the application document comprises not only "direct connection" but also "indirect connection".

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 is a schematic diagram showing indexes of the high speed memory in the hybrid low speed memory system. For sake of convenience, the disclosure describes solutions according to the embodiments of the invention by taking HDD and SSD as an example. However, those skilled in the art could easily apply the solutions to other hybrid low speed memory systems.

Although the present application document describes the solutions according to the embodiments of the invention mainly by using two different kinds of low speed memories as an example, those skilled in the art could easily extend the solutions into three or more low speed memories. The two different kinds here may be different in physical characteristic of the low speed memory per se, or may be different in workload of the low speed memory. For example, as for the response time, HDD and SSD have different response time due to different physical characteristics. On the other hand, even if for two HDD devices of the same model, if the workload of a device possibly is several times of that of another device, they are greatly distinct from each other in response time.

FIG. 1 comprises two types of indexes, namely, non-free index and free index. Each index entry in the index indicates a storage unit in the high speed memory. The index may comprise a pointer, a page identifier or a hash value or the like corresponding to the storage unit. Since there exists a correspondence relation between the index entry and the storage unit in the high speed memory, in the present application document, sometimes the index entry also indicates the storage unit in the high speed memory.

When it is needed to promote a piece of new data in the low speed memory to the high speed memory, an index entry in the free index is moved into the non-free index, that is, the indicated storage unit in the high speed memory is assigned to the corresponding low speed memory by including in the non-free index an index entry; on the contrary, in the demotion operation, an index entry in the non-free index is moved to the free index to thereby recover the indicated storage unit in the high speed memory. In the present example, since there exist two different kinds of low speed memories, two non-free indexes, namely, HDDindex and SSDindex, are provided, wherein each index entry in HDDindex indicates that there is a storage unit storing the data from HDD in the high speed memory, and each index entry in SSDindex indicates that there is a storage unit storing the data from SSD in the high speed memory. Uindex is a free index, in which each index entry indicates a free storage unit in the high speed memory.

As described above, if the index entries corresponding to the storage units assigned to the HDD and SSD in the high speed memory are placed in the same non-free index, the storage units in the high speed memory will be continuously assigned to the SSD rather than to the HDD, thereby affecting the overall performance of the system. Therefore, in one exemplary embodiment, corresponding non-free indexes are provided respectively for the HDD and SSD.

Those skilled in the art could easily design various ways of ordering the index entries in the non-free index. However, in the LRU algorithm, for sake of convenience, the index entries in the non-free index are ordered generally according to the time sequence that the storage units in the high speed memory are accessed. A basic idea of LRU is if a storage unit in the high speed memory corresponding to an index entry in the non-free index is accessed, the index entry is moved to the top end of the non-free index. When a demotion operation is needed, one or more bottom index entry in the non-free index is selected to be moved into the free index.

In a hybrid low-speed memory system composed of HDD and SSD, it is needed to further determine whether to move index entries out from HDDindex or from SSDindex. As described before, the case of always moving index entries out from HDDindex shall be avoided.

Figure 2:
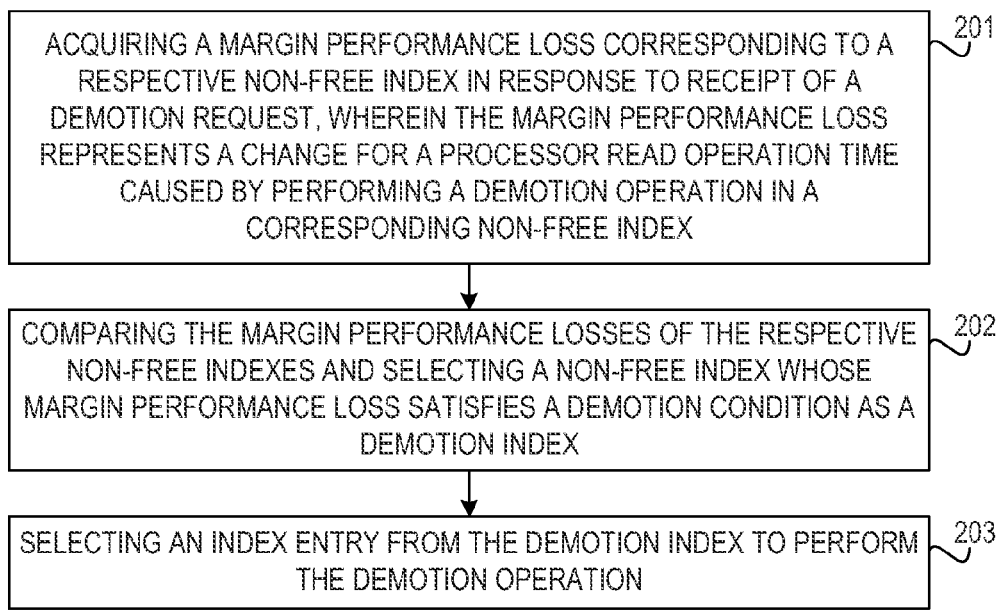
FIG. 2 is a flow chart showing a method of managing a high speed memory according an illustrative embodiment.

A method of assigning the high speed memory according to an illustrative embodiment will be described below with reference to FIG. 2.

A step 201 comprises acquiring a margin performance loss corresponding to a respective non-free index in response to receipt of a demotion request, wherein the margin performance loss represents a change in a response time caused by performing a demotion operation in a corresponding non-free index.

The change in the response time caused by performing the demotion operation on the non-free index depends on the following two factors: a margin hit rate loss corresponding to the non-free index and a synthesized response time of the low speed memory corresponding to the non-free index. The margin performance loss of the non-free index can be calculated by the following formula:

$$M_i = RT_i \times CH_i, \ i \in \{hdd, ssd\}$$

where M represents the margin performance loss, RT represents the synthesized response time, and CH represents the margin hit rate loss.

Hit means that, when the processor needs to perform random read operation on external data, it is found that a copy of the external data has been stored in the high speed memory, thus the processor directly accesses the storage unit in the high speed memory without the need of accessing the low speed memory any more.

Hit rate denotes a number of hits in an elementary time interval, and depends on not only a number of storage units in the high speed memory assigned to the low speed memory, i.e., a number of index entries in the corresponding non-free index, but also a number of times that the processor needs to access the external data in an elementary time interval. It should be appreciated that in case the number of times that the processor needs to access the external data in an elementary time interval is fixed, the more the number of the storage units in the high speed memory assigned to the low speed memory, the more the number of copies stored, and thus the higher the hit rate. In the extreme, if all the external data in the low speed memory have corresponding copies in the high speed memory, the processor only accesses the high speed memory each time it needs to access the external data, so the hit rate only depends on the number of times that the processor needs to access the external data in an elementary time interval.

The physical meaning of the margin hit rate loss is a hit rate reduced by decreasing a storage unit from the storage units in the high speed memory assigned to the low speed memory. In other words, the margin hit rate loss represents a reduced hit rate caused by performing the demotion operation in the non-free index corresponding to the low speed memory. It should be readily appreciated that the larger the number of storage units in the high speed memory assigned to the low speed memory, the smaller the value of the margin hit rate loss. In a worst case, if the number of the storage units in the high speed memory assigned to the low speed memory is larger than a total amount of the external data in the low speed memory, even if a storage unit is decreased from the storage units in the high speed memory assigned to the low speed memory, the hit rate will not be reduced.

Those skilled in the art would appreciate in case the synthesized response time of the low speed memory corresponding to the non-free index is fixed, the larger the margin hit rate loss, the larger the margin performance loss. Therefore, in case the synthesized response times of the low speed memory corresponding to respective non-free indexes are close to each other, the margin hit rate loss per se can also be used as the margin performance loss.

It can be seen from the formula of calculating the margin performance loss that the physical meaning of the margin performance loss is that the hit rate is reduced by performing the demotion operation on the non-free index. The processor originally only needs to access the high speed memory when accessing external data, but since the low speed memory is accessed with the reduced hit rate, the processor will take a longer read operation time to access the external data. If the hit rate is greatly reduced by performing the demotion operation on the free index, or the read operation time taken by the processor to access the low speed memory is much longer, the overall performance of the system will be greatly deteriorated.

A step 202 comprises comparing the margin performance losses of the respective non-free indexes and selecting a non-free index whose margin performance loss satisfies a demotion condition as a demotion index.

As described above, the physical meaning of the margin performance loss is the read operation time for accessing the external data increased by performing the demotion operation on the non-free index. After obtaining the margin performance loss of the respective non-free indexes, a non-free index whose margin performance loss satisfies the demotion condition can be selected as a demotion index. If a value of the margin performance loss of a non-free index is less than a margin performance loss threshold, or the margin performance loss of a non-free index is less than that of other free indexes, the non-free index may be regarded as a demotion index.

A step S203 comprises selecting an index entry from the demotion index to perform the demotion operation.

If an index entry is selected from the demotion index for the demotion operation, the index entry enters the free index. That is to say, the storage unit in the high speed memory indicated by the index entry will be released, whereby it can be used for storing a copy of other data when required. How to select an index entry from the non-free index for the demotion operation is customary technical means in the art and thus is omitted here.

It can be seen from the steps 201 to 203 that the method according to the embodiment of the invention takes into consideration that performing the demotion operation on which non-free index will have a smallest influence on the processor read operation time for accessing the external data, when performing the demotion operation. For example, in a scenario where the hybrid low speed memory comprises both SSD device and HDD device, assume that directly reading the data from a HDD 15000 RPM needs a synthesized response time of 10 ms, but directly reading the data from a SSD needs a synthesized response time of 1 ms. Although the index entry in SSDindex corresponds to a hit rate larger than that of the index entry in HDDindex, if the margin hit rate loss corresponding to SSDindex does not reach 10 times of the margin hit rate loss corresponding to HDDindex, a demotion operation shall be performed on SSDindex. As described before, theoretically, the larger the number of storage units in the high speed memory assigned to the low speed memory, the smaller the value of the margin hit rate loss. That is, the margin hit rate loss corresponding to the same non-free index is also related to the current length of the non-free index. As a result, the same non-free index has a larger opportunity to be selected as a demotion index when the length thereof is longer, which complies with the common knowledge.

The following describes how to calculate the margin hit rate loss CH and the synthesized response time RT. The margin hit rate loss and the synthesized response time both are concepts relative to a non-free index. In the scenario of hybrid low speed memory, a corresponding margin hit rate loss and synthesized response time shall be calculated for HDDindex and SSDindex, respectively. The following describes how to calculate the margin hit rate loss and the synthesized response time corresponding to SSDindex as an example.

There are many methods to calculate the margin hit rate loss CH, for example, by way of experiments. Specifically, first make statistics about an average of the number of times that the processor needs to access the external data in an elementary time interval, then, based on the average, record a reduction in hit rate that is caused by decreasing a storage unit from the storage units in the high speed memory assigned to the low-speed processor. As described before, the margin hit rate loss is related to the number of storage units in the high speed memory assigned to the low speed memory, so the experiments need to be made directing at different numbers of storage units in the high speed memory assigned to the low speed memory.

According to an embodiment of the invention, the margin hit rate loss can be obtained by using the feature of LRU algorithm. As described above, the basic idea of the LRU algorithm is if a storage unit in the high speed memory corresponding to an index entry in SSDindex is accessed, the index entry is moved to the top end of SSDindex. Therefore, statistically, the storage unit in the high speed memory corresponding to the bottom index entry of the SSDindex is the storage unit whose number of hits in an elementary time interval is the least among the storage units in the high speed memory assigned to HDD, or the storage unit with the lowest hit rate. The hit rate of the storage unit in the high speed memory corresponding to the index entry can be used as the margin hit rate loss. The following explains why the hit rate can be used as the margin hit rate loss. Firstly, the value of the hit rate represents the reduction in hit rate without the storage unit, which satisfies the definition of the margin hit rate loss. Secondly, as described before, the larger the number of storage units in the high speed memory assigned to the low speed memory, the smaller the value of the margin hit rate loss. Therefore, letting a minimal of the hit rates corresponding to the index entries in SSDindex be the margin hit rate loss also meets actual situations.

An advantage of the method primarily is that the margin hit rate loss can be obtained dynamically. Since the number of times that the processor needs to access the external data in an elementary time interval may greatly change over time, a static average may be not accurate enough. Furthermore, the method eliminates the need of directing at different numbers of storage units in the high speed memory assigned to the low speed memory in the experiments.

In actual operations, the index entry that is arranged at the bottom of SSDindex in a previous sampling period possibly will be moved to the top end of SSDindex in a next sampling period since the corresponding storage unit in the high speed memory is accessed. In order that there are more history data in the next sampling period for calculating the hit rate corresponding to the index entry arranged at the bottom of SSDindex, the number of times that the storage units in the high speed memory corresponding to a plurality of index entries arranged at the bottom of SSDindex are accessed can be recorded. In this way, after a last index entry arranged at the bottom of the SSDindex is moved following SSDindex, the hit rate corresponding to the last second index entry in SSDindex can also be accurately calculated.

According to the method of the embodiment, the hit rate reduced by decreasing a storage unit from the storage units in the high speed memory assigned to the low speed memory is directly calculated as the margin hit rate loss. As described before, the margin hit rate loss is used for calculating the margin performance loss, and the margin performance loss is used for judging from which non-free index the demotion operation is performed. Therefore, the method according to the embodiment can accurately embody the physical meaning of the margin hit rate loss.

The margin hit rate loss is a quantity changing continuously. Therefore, in the case a certain amount of storage units in the high speed memory have been assigned to the low speed memory, a margin hit rate gain shall be approximate to the margin hit rate loss in the case. The margin hit rate gain refers to a hit rate increased by again assigning a storage unit in the high speed memory to the low speed memory. Those skilled in the art could design other methods to firstly calculate the margin hit rate gain and then use the value of the margin hit rate gain as the value of the margin hit rate loss.

The following describes how to calculate the synthesized response time corresponding to SSDindex.

Those skilled in the art would appreciate that SSDindex may service a number of different SSD devices, so by averaging predicted values of the average response times of the respective SSD devices, the synthesized response time corresponding to SSDindex can be obtained. According to an example embodiment, the synthesized response time corresponding to SSDindex can be calculated according to the following formula:

$$RTssd = \frac{\sum_{e \in SSD} EMA\_RT(e) * EMA\_IOPS(e)}{\sum_{e \in SSD} EMA\_IOPS(e)} \quad (1)$$

The formula (1) means that, the synthesized response time RTssd corresponding to SSDindex is a weighted average of predicted values of the average response times of each of the SSDs according to predicted values of the corresponding number of accesses, where EMA_RT(e) represents a predicted value of the average response time of the e-th SSD device, and EMA_IOPS(e) represents a predicted value of the number of accesses of the e-th SSD device. In the weighted average solution, the predicted value of the average response time of the SSD device that has a larger number of accesses has a larger weight in calculating the synthesized response time, which can more accurately reflect the requirements on the high speed memory. Those skilled in the art would appreciate it is a special case that SSDindex only services a SSD device. In this case, the synthesized response time of SSDindex can also be calculated according to the above method. The calculated synthesized response time is the predicted value of the average response time of one SSD device.

Similarly, the formula for calculating the synthesized response time corresponding to HDDindex is:

$$RThdd = \frac{\sum_{e \in HDD} EMA\_RT(e) * EMA\_IOPS(e)}{\sum_{e \in HDD} EMA\_IOPS(e)} \quad (2)$$

Since the same method can be adopted for calculating EMA_RT and EMA_IOPS of each SSD device, and the calculation of EMA_RT and EMA_IOPS is a statistical process over time, in the following description, EMA_RT is represented as a time function, i.e., PredictedRT(n), and EMA_IOPS is represented as a time function, i.e., PredictedIOPS(n). Furthermore, since PredictedRT(n) and PredictedIOPS(n) can be calculated similarly, the calculation of PredictedRT(n) is mainly described below.

There are many ways to calculate PredictedRT(n). The basic idea is to dynamically predict the predicted value of the average response time in a next sampling period by making statistics about the predicted value and actual value of the average response time in the previous sampling period. In actual systems, due to difference in hardware configuration or difference in workloads, the response time of the same low speed memory may have a large difference, so it is necessary to calculate the predicted value of the average response time dynamically. The same applies to the predicted value of the number of accesses.

According to an example embodiment, the prediction may be made by using Kalman filtering.

According to an embodiment, the predicted value of the average response time can be calculated by the following formula:

$$PredictedRT(n+1) = (1-\alpha) \times PredictedRT(n) + \alpha \times ActualRT(n) \quad (2)$$

where PredictedRT(n+1) represents the predicted value of the average response time of the sampling period n+1, and PredictedRT(n) represents the predicted value of the average response time of the sampling period n, ActualRT(n) represents a measured actual value of the average response time in the sampling period n, and $\alpha$ is a number greater than 0 and less than 1.

Similarly, the predicted value of the number of accesses can be calculated by the following formula:

$$PredictedIOPS(n+1) = (1-\alpha) \times PredictedIOPS(n) + \alpha \times ActualIOPS(n)$$

where PredictedIOPS(n+1) represents the predicted value of the number of accesses of the sampling period n+1, and PredictedIOPS(n) represents the predicted value of the number of accesses of the sampling period n, ActualIOPS(n) represents a measured actual value of the number of accesses in the sampling period n, and a is a number greater than 0 and less than 1.

It can be seen from the formula (2) that, theoretically, when calculating the predicted value of the average response time of the sampling period n+1, not only the predicted values of the average response time calculated for the sampling period n and each of the earlier sampling periods, but also the measured actual values of the average response time calculated for the sampling period n and each of the earlier sampling periods are taken into consideration. However, the predicted value and actual value of the average response time corresponding to a sampling period farer away from the sampling period n+1 have smaller weights in calculating the predicted value of the average response time of the sampling period n+1, and the weights decrease exponentially.

According to a further embodiment, the weight can be set according to other modes, e.g., decreasing in linear mode, decreasing in logarithm mode, decreasing in stepped mode or the like, wherein the stepped mode takes into consideration the predicted value and actual value of the average response time corresponding to the sampling period within a distance from the sampling period n+1 with the same weight, without considering the predicted value and actual value of the average response time corresponding to the sampling period beyond a distance from the sampling period n+1. Those skilled in the art could design other modes to set weights of the predicted value and actual value of the average response time in the sampling period n and each of the earlier sampling periods.

As described above, $\alpha$ is a number greater than 0 and less than 1. The value of $\alpha$ has influences in two aspects. Firstly, the smaller the value of $\alpha$, the smaller an influence of the burst average response time in the previous sampling period on the predicted result. Secondly, the smaller the value of $\alpha$, the faster the weight is decreased in the above exponential mode.

As for the first aspect, assume that the predicted value of the average response time of the sampling period n is E. If in a steady state, the actual value of the response time of the sampling period n can be regarded as approximate to E. The predicted value of the average response time of the sampling time n+1, calculated according to the formula (2) is also E. In case of a burst in the sampling period n, an actual value of the average response time in the sampling period n is 5E, and the predicted value of the average response time of the sampling period n+1, calculated according to the formula (2) is also $E \times (1+4\alpha)$. Assume that the value of $\alpha$ is 0.01, 5 times of the burst average response time only brings a change of 4%.

However, if the actual value of the average response time is 5E in the subsequent sampling periods, it is wished that the predicted value of the response time is approaching to 5E as soon as possible. However, due to the influence in the second aspect, in case of a very small $\alpha$, the predicted value of the response time will slowly approach 5E.

According to an embodiment of the invention, a ratio of sampling period to workload changing period may be used as the value of $\alpha$. For example, in most scenarios, the workload changing period is one day, and by assuming that the sampling period is 10 minutes, the value of $\alpha$ is $10/(24 \times 60) = 1/144$. Those skilled in the art could design other methods to calculate the value of $\alpha$, for example, by multiplying the ratio with a constant. By determining $\alpha$ in this way, periodicity of the load can be taken into full consideration when performing demotion to avoid inferences brought by disturbance in the workload mode, thereby enhancing robustness and greatly improving accuracy.

In the above description, the time required for the processor to access the high speed memory is neglected. Since the processor needs accessing the high speed memory either in case of hit or in case of not hit, in order to more accurately reflect the meaning of the margin performance loss, in case the processor read operation time of the high speed memory is not negligible with respect to the processor read operation time of the low speed memory, the processor read operation time of the high speed memory can be subtracted from the synthesized response time of the non-free index. At the time, $$EMA\_RT = PredictedRT(n) - RT_{high\ speed\ memory}$$

where RThigh speed memory represents the processor read operation time of the high speed memory, which is relatively fixed for the system. For example, for the storage system that is popular nowadays, the value of RThigh speed memory is 0.2 ms.

Figure 3:
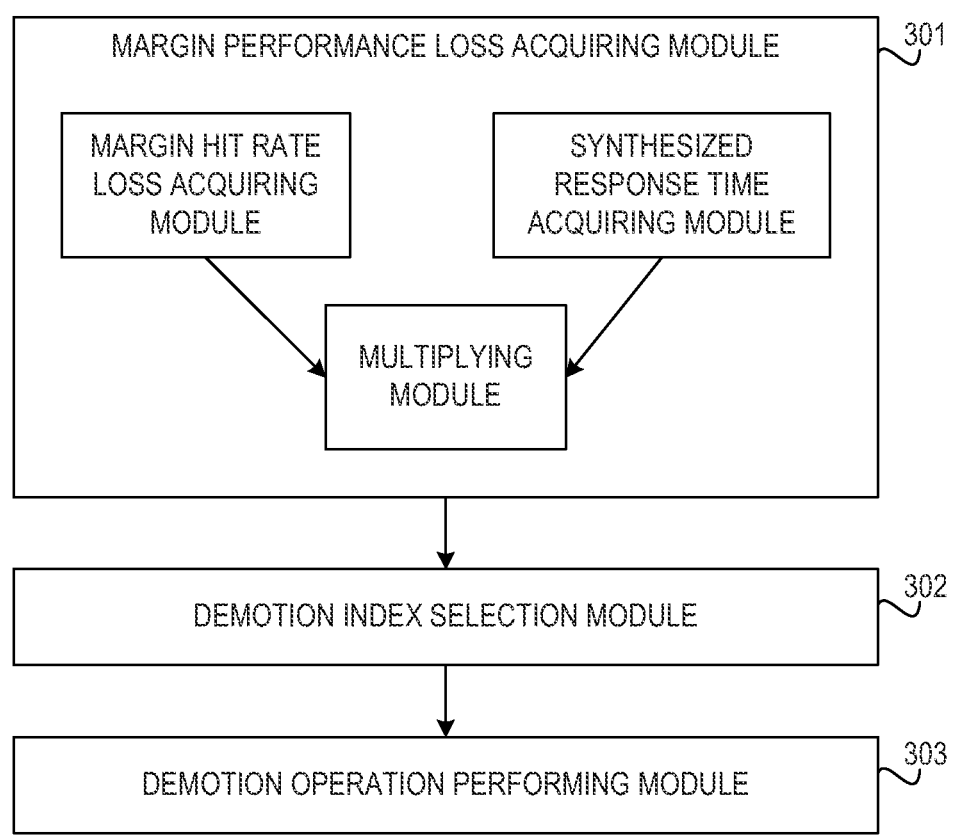
FIG. 3 is a block diagram showing an apparatus for managing a high speed memory according to an illustrative embodiment.

FIG. 3 is a block diagram showing an apparatus for managing a high speed memory according to an illustrative embodiment, comprising:

a margin performance loss acquiring module 301 configured to acquire a margin performance loss corresponding to a respective non-free index in response to receipt of a demotion request, wherein the margin performance loss represents a change in a processor read operation time caused by performing a demotion operation in a corresponding non-free index;

a demotion index selecting module 302 configured to compare the margin performance losses of the respective non-free indexes and select a non-free index whose margin performance loss satisfies a demotion condition as a demotion index; and a demotion operation performing module 303 configured to select an index entry from the demotion index to perform the demotion operation.

The margin performance loss acquiring module 301 comprises:

a margin hit rate loss acquiring module configured to acquire a margin hit rate loss corresponding to the non-free index;

a synthesized response time acquiring module configured to acquire a synthesized response time corresponding to the non-free index; and a multiplying module configured to multiply the margin hit rate loss with the synthesized response time and have the product thereof as the margin performance loss.

As described above, the margin performance loss acquiring module 301 may also comprise a margin hit rate acquiring module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The scope of protection of the invention is defined by the claims and equivalents thereof.

What is claimed is:

1. A method of managing a high speed memory, the method comprising:

determining, in response to receipt of a demotion request, margin performance losses corresponding to respective non-free indexes, wherein corresponding non-free indexes are set for different types of low speed memory, wherein each non-free index comprises index entries indicating a storage unit in a high speed memory assigned to a corresponding low speed memory, wherein a storage unit in the high speed memory is recovered by demoting an index entry from a given non-free index, wherein a given margin performance loss represents a change in a processor read operation time caused by performing a demotion operation in a corresponding non-free index;

comparing the margin performance losses of the respective non-free indexes and selecting as a demotion index a non-free index whose margin performance loss satisfies a demotion condition; and selecting an index entry from the demotion index to perform the demotion operation, wherein determining margin performance losses comprises:

determining a margin hit rate loss corresponding to the respective non-free index;

determining a synthesized response time corresponding to the respective non-free index, wherein the synthesized response time corresponding to the respective non-free index is a weighted average of predicted values of the average response time of the low speed memories corresponding to the respective non-free index according to predicted numbers of accesses; and multiplying the margin hit rate loss by the synthesized response time determine the margin performance loss.

2. The method according to claim 1, wherein if a storage unit in the high speed memory corresponding to an index entry is accessed, the index entry is moved to the top end of the non-free index; and wherein determining a margin performance loss corresponding to a respective non-free index comprises:

using the hit rate of the storage unit in the high speed memory corresponding to the index entry at the bottom end of the respective non-free index as the margin hit rate loss.

3. The method according to claim 2, further comprising:

recording how many times the storage units in the high speed memory corresponding to a plurality of index entries located at the bottom of the respective non-free index are accessed.

4. The method according to claim 1, wherein the predicted value of the average response time of a low speed memory in a next sampling period is predicted by calculating the predicted value and the actual value of the average response time of the low speed memory in a previous sampling period.

5. The method according to claim 4, wherein the predicted value of the average response time of the low speed memory is calculated according to the following formula:

$$PredictedRT(n+1)=(1-\alpha)\times PredictedRT(n)+\alpha\times ActualRT(n)$$

where PredictedRT(n+1) represents the predicted value of the average response time of the sampling period n+1, and PredictedRT(n) represents the predicted value of the average response time of the sampling period n, ActualRT(n) represents a measured actual value of the average response time in the sampling period n, and $\alpha$ is a number greater than 0 and less than 1.

6. The method according to claim 1, wherein the predicted number of accesses of a low speed memory in a next sampling period is predicted by calculating the predicted number of accesses and the actual number of accesses of the low speed memory in a previous sampling period.

7. The method according to claim 6, wherein the predicted number of accesses of the low speed memory is calculated according to the following formula:

$$PredictedIOPS(n+1)=(1-\alpha)\times PredictedIOPS(n)+\alpha\times ActualIOPS(n)$$

where PredictedIOPS(n+1) represents the predicted number of accesses of the sampling period n+1, and PredictedIOPS(n) represents the predicted number of accesses of the sampling period n, ActualIOPS(n) represents a measured actual number of accesses in the sampling period n, and $\alpha$ is a number greater than 0 and less than 1.

8. The method according to claim 7, wherein $\alpha$ equals a ratio of the sampling period to a workload changing period.

9. The method according to claim 1, wherein the synthesized response time of a storage device, SD, is calculated according to the following formula:

$$RT = \frac{\sum_{e=SD} EMA\_RT(e) * EMA\_IOPS(e)}{\sum_{e=SD} EMA\_IOPS(e)},$$

where EMA_RT(e) represents a predicted value of the average response time of the $e^{th}$ storage device, and EMA_IOPS(e) represents a predicted value of the number of accesses of the $e^{th}$ storage device.

* * * * *